United States Patent Office 2,943,089
Patented June 28, 1960

2,943,089

NEW PHENAZINE DERIVATIVES

Vincent C. Barry, Rathgar, James G. Belton, Terenure, Michael L. Conalty, Dublin, Dermot Twomey, Terenure, and John F. O'Sullivan, Ranelagh, Ireland, and Ernst Hodel, Basel, Switzerland, assignors to Geigy Chemical Corporation, New York, N.Y., a corporation of Delaware No Drawing. Filed Apr. 7, 1958, Ser. No. 726,604

Claims priority, application Switzerland Apr. 15, 1957

4 Claims. (Cl. 260—267)

The present invention concerns new phenazine derivatives which have valuable chemotherapeutic, in particular, tuberculostatic properties, as well as processes for the production of these compounds.

It is known that by oxidising N-phenyl-o-phenylendiamine hydrochloride with ferric chloride, 2-anilino-3-imino-5-phenyl-3.5-dihydro-phenazine (anilino-aposafranine) is obtained which has tuberculostatic activity, see Nature 162, 622—623 (1948).

Surprisingly it has now been found that 2-amino-3-imino-3.5-dihydro-phenazines having three substituents bound to nitrogen atoms and which correspond to the general formula:

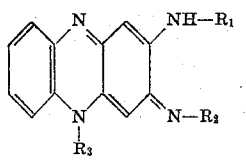

I wherein two of the three symbols $R_1$, $R_2$ and $R_3$ represent phenyl radicals or the same halogenphenyl, lower alkylphenyl or lower alkoxyphenyl radicals, and the third symbol represents a lower dialkylaminoalkyl radical, have a considerably more strong tuberculostatic activity than the phenazine derivatives which have been previously described. In addition, in pharmacological trails they differ from the known tuberculostatics in that, e.g. they keep mice infected with tubercle bacilli alive long after the completion of the treatment.

Compounds according to the above general formula can be produced in a simple manner from 2-arylamino-3-imino-5-aryl-3.5-dihydro-phenazines or from the isomeric 2 - amino - 3-arylimino-5-aryl-3.5-dihydrophenazines by heating a salt, in particular the hydrochloride of such a compound corresponding to one of the two formulae:

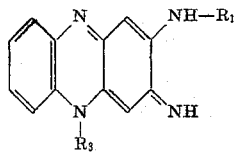

II or

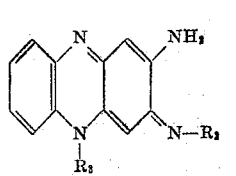

III wherein the two symbols $R_1$ and $R_3$, or $R_2$ and $R_3$ represent the same aryl radicals according to the definition given above, with a lower dialkylaminoalkyl amine.

Starting materials of the general Formula II having substituted aryl radicals Ar can be obtained analogously to the known anilino-aposafranine by oxidizing N-aryl-o-phenylendiamines, in which the phenyl radical having no primary amino group is substituted by chlorine, bromine or low molecular alkyl or alkoxy groups, with ferric chloride. Apart from the above named compound, examples of suitable starting materials are 2 - (o - chlor-anilino)-3-imino-5-(o'-chloro-phenyl)3.5-dihydro-phenazine,
2 - (p - chlor - anilino)-3-imino-5-(p'-chloro-phenyl)-3.5-dihydro-phenazine,
2 - (p - bromo - anilino)-3-imino-5-(p'-bromo-phenyl)-3.5-dihydro-phenazine,
2 - (o-toluidino)-3-imino-5-(o'-tolyl)-3.5-dihydro-phenazine,
2 - (p-toluidino)-3-imino-5-(p'-tolyl)-3.5-dihydro-phenazine,
2 - (p - ethyle-anilino)-3-imino-5-(p'-ethyl-phenyl)-3.5-dihydro-phenazine,
2 - (o - anisidino) - 3-imino-5-(o'-anisyl)-3.5-dihydro-phenazine,
2 - (p - anisidino) - 3-imino-5-(p'-anisyl)-3.5-dihydro-phenazine,
2 - (p - phenetidino) - 3 - imino - 5 - (p'-phenetyl)-3.5-dihydro-phenazine,
2 - (p - n - propoxy-anilino)-3-imino-5-(p'-n-propoxy-phenyl)-3.5-dihydro-phenazine, and
2 - (p - isopropoxy - phenyl)-3-imino-5-(p'-isopropoxy-phenyl)-3.5-dihydro-phenazine.

Isomeric starting materials of the general Formula III are obtained if salts of 2-amino-diphenylamine or 2-amino-diphenylamines the phenyl radical of which having no primary amino group is substituted by chlorine, bromine or low alkyl or alkoxy groups, are oxidised with benzoquinone instead of with ferric chloride. Examples of starting materials of the general Formula III are 2 - amino-3-phenylimino-5-phenyl-3.5-dihydro-phenazine;
2 - amino - 3 - (p-tolylimino)-5-(p'-tolyl)-3.5-dihydro-phenazine;
2 - amino - 3 - (o-anisylimino)-5-(o'-anisyl)-3.5-dihydro-phenazine;
2 - amino - 3 - (p-anisylimino)-5-(p'-anisyl)-3.5-dihydro-phenazine;
2 - amino - 3 - (p-phenetylimino)-5-(p'-phenetyl)-3.5-dihydro-phenazine;
2 - amino - 3 - (p-isopropoxy-phenylimino)-5-(p'-isopropoxy-phenyl)-3.5-dihydro-phenazine, and
2 - amino-3-(p-chlorophenylimino)-5-(p'-chloro-phenyl)-3.5-dihydro-phenazine.

In the form of their salts, in particular hydrochlorides, these compounds of the general Formula II or III can be reacted with e.g. β-dimethylamino-ethylamine, β-methylethylamino-ethylamine, β-diethylamino-ethylamine, β-dibutylamino-ethylamine, γ-dimethylamino-propylamine or γ-diethylamino-propylamine.

Compounds of Formula I in which $R_3$ represents a lower dialkylaminoalkyl radical and therefore $R_1$ and $R_2$ represent aryl radicals, are obtained by condensing a 2-hydroxy-5-arylamino-1.4-benzoquinone 4-arylimine or a 4.5-diarylamino-1.2-benzoquinone which is a tautomer thereof, corresponding to the two formulae:

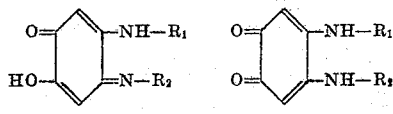

IV        V respectively wherein $R_1$ and $R_2$ represent the same aryl radicals, as defined after Formula I, with a mineral acid salt of a lower dialkylaminoalkyl-o-phenylendiamine. The condensation can be performed by heating the reaction components together at moderately high temperatues, e.g. by boiling in alcohol. The starting materials of the Formulae IV and V necessary for this process are obtainable for example by condensing oxidation of a mixture of brenzcatechin and aniline, a halogen aniline, alkylaniline or alkoxyaniline in molecular ratio of 1:2 by means of silver oxide or lead dioxide. Examples of arylamines suitable for the reaction with brenzcatechin are aniline, o-, m- and p-toluidine, p-ethylaniline, p-tert. butyl aniline, o-, m- and p-anisidine, p-phenetidine, p-isopropoxy aniline, o-chloraniline, m-chloraniline, p-chloraniline, m-fluoraniline, p-fluoraniline and p-bromaniline. The intermediate products of the Formulae IV or V obtained therefrom can be reacted e.g. with N-dimethylaminoethyl-, N-diethyl-aminoethyl-, N-dibutyl-aminoethyl- or N-(γ-dimethylamino-propyl)-o-phenylendiamine.

The following examples further illustrate the production of the new phenazine derivatives. Parts are given as parts by weight and their relationship to parts by volume is as that of grammes to millilitres. The temperatures are in degrees centigrade.

*Example 1*

(a) 22 parts of brenzcatechin and 42.8 parts of p-toluidine are dissolved in 900 parts by volume of alcohol. A solution of 40 parts of sodium iodate in 900 parts by volume of water is poured in within 30 minutes while stirring, care being taken by external cooling that the reaction temperature does not exceed 50°. A red precipitate is formed immediately. To complete the reaction, the reaction mixture is stirred for another 6 hours at room temperature. The red reaction product is filtered off under suction and washed free of the inorganic salts with 1500 parts of water. It is finally washed three times with 25 parts by volume of methanol each time. The 4,5-bis-(p-toluidino)-1,2-benzoquinone (or 2-hydroxy-5 p-toluidino-1.4-benzoquinone-4-(N-p-tolyl)-imine) so obtained is dried either in the vacuum desiccator over sodium hydroxide or in the oven at a lightly raised temperature. It melts at 188–190° and is sufficiently pure for the further reaction. Recrystallised from benzene, red crystals which melt at 190–191° are obtained.

(b) 15.9 parts of N-diethylaminoethyl-o-phenylendiamine in 400 parts by volume of abs. alcohol are neutralised with 6.2 parts by volume of concentrated hydrochloric acid. 23.8 parts of 4.5-bis-p-toluidino-1.2-benzoquinone are then added and the mixture is boiled while stirring for 15 hours. At 60–70°, 30 parts by volume of concentrated ammonia are added dropwise within half an hour to the red coloured solution and the whole is stirred first for 2 hours at 60–70°, then for 2 hours at room temperature and finally for 2 hours while cooling with ice. The reaction product is filtered off under suction and washed with 500 parts of water. The dry reaction product is a brown powder which melts at 158–161°. It is purified by recrystallisation from a large amount of methyl alcohol. The 2-(4'-methylanilino)-3-(4'-methyl-phenylimino) - 5 - (β - diethylaminoethyl) - 3.5 - dihydro-phenazine is obtained as dark red needles which melt at 168–170°

*Example 2*

(a) 22 parts of brenzcatechin and 54.8 parts of p-phenetidine are dissolved in 900 parts by volume of alcohol. A solution of 40 parts of sodium iodate in 900 parts of distilled water is poured in within 75 minutes while stirring, care being taken by cooling occasionally that the temperature does not rise above 26°. The reaction mixture is then stirred for 15 hours at room temperature and the product is worked up in a manner analogous to that described in Example 1. The crude 4.5-bis-(p-ethoxy-amino)-1.2-benzoquinone (or 2-hydroxy-5-(p-ethoxy-anilino)-1.4 - benzoquinone - 4 - (N - p' - ethoxyphenyl)-imine) is a dark red powder which melts at 170–172° on decomposition. On recrystallisation from benzene, the substance is obtained in the form of dark red crystals which melt at 173–175° on decomposition.

(b) 10.35 parts of N-diethylaminoethyl-o-phenylendiamine are dissolved in 500 parts by volume of alcohol and the solution is neutralised with 4.1 parts by volume of concentrated hydrochloric acid. 18.9 parts of 4.5-bis-(p-ethoxyanilino)-1.2-benzoquinone are then added while stirring and the reaction mixture is boiled under reflux for 15 hours. A suspension of the red coloured hydrochloride of 2-(4'-ethoxyanilino) - 3 - (4''-ethoxyphenylimino)-5-(β-diethylaminoethyl)-3.5-dihydro-phenazine is obtained. The base is liberated by adding 30 parts by volume of concentrated ammonia dropwise at 60–70° within half an hour and then stirring, first for 2 hours at 60–70°, then for 2 hours while cooling to room temperature and finally for 2 hours while cooling with ice. The substance is then filtered off under suction and washed with 1000 parts of water whereupon red-black shining crystals are obtained which melt at 128–130°. On recrystallising from ethyl acetate, red-brown needles which melt at 148–150° are obtained.

*Example 3*

(a) 44 parts of brenzcatechin and 102 parts of p-chloraniline are dissolved in 1800 parts by volume of alcohol and the solution of 80 parts of sodium iodate in 1800 parts of water is poured in within 45 minutes, the temperature being held under 28° by occasional cooling. The reaction mixture is then stirred for 12 hours at room temperature, the red precipitate is filtered off under suction and washed, first with 3000 parts of water and then three times with 150 parts by volume of alcohol each time. The crude 4.5-bis-(p-chlor-anilino)-1.2-benzoquinone (or 2-hydroxy-5-(p-chlor-anilino)-1.4-benzoquinone-4-(N-p-chloro-phenyl)-imine) is dried analogously to Example 1(a). M.P. 207–212° on decomposition.

On recrystallising from benzene, long, fine, red crystals are obtained which melt at 215–218° on decomposition.

(b) 10.35 parts of diethylamino-ethyl-o-phenylendiamine are dissolved in 600 parts by volume of alcohol. 4.1 parts by volume of concentrated hydrochloric acid and then 17.95 parts of 4.5-bis-(p-chlor-anilino)-1.2-benzoquinone are added and the whole is boiled under reflux for 15 hours. A suspension of the red hydrochloride of 2-(4'-chlor-anilino)-3-(4''-chlorophenylimino)-5-(β-diethylaminoethyl) - 3.5 - dihydro-phenazine is obtained. 30 parts by volume of ammonia are added dropwise at 60–70° within half an hour, the whole is stirred, first for 2 hours at 60–70°, then for 2 hours while cooling to room temperature and finally for 2 hours while cooling with ice. The free base which precipitates is washed with 500 parts of water. It is a dark brown powder which melts at 130–131°. On recrystallising from alcohol, microscopically small red crystals are obtained which melt at 166–167°.

If in the first step of the preceding examples, the arylamine used is replaced by aniline, p-anisidine, 4-n-propoxy-aniline, 4-n-hexyloxy-aniline, 3-chloro-aniline, 3.4-dichloro-aniline, 7-chloro-4-ethoxy-aniline, m-toluidine or 3.4-dimethyl-aniline, the following intermediate and end products are obtained in an analogous manner: 4.5-dianilino-1.2-benzoquinone (or tautomer) M.P. 188–190°, red prisms from benzene, and 2-anilino-3-phenyl-imino-5(β-diethylamino-ethyl)-3.5 - dihydro - phenazine, M.P. 145–147°, dark red needles from ethanol; 4.5-bis-(p-anisidino)-1.2-benzoquinone (or tautomer), M.P. 183.5–185°, clusters of blue-red prisms from ethanol, and 2-(4'-anisidino)-3-(4'' - methoxy - phenylimino) - 5 - (β-diethylamino-ethyl)-3.5-dihydro-phenazine; 4.5-bis-(4'-n-propoxy-anilino)-1.2-benzoquinone (or tautomer) M.P. 132–133° (on decomposition), red crystals from benzene, and 2-(4'-n-propoxy-anilino)-3-(4''-n - propoxy - phenyl-imino)-5-(β-diethylamino-ethyl)-3.5-dihydro - phenazine, M.P. 145–146°, small brown-red needles from ligroin; 4.5-bis-(4'-n-hexyloxy-anilino)-1.2-benzoquinone (or tautomer), M.P. 96–98°, small red crystals from benzene, and 2-(4'-n-hexyloxy-anilino)-3-(4''-n-hexyloxy - phenylimino)-5-(β-diethylamino-ethyl) - 3.5 - dihydro - phenazine; 4.5-bis-(4'-chloro-anilino)-1.2-benzoquinone, M.P. 148–150°, blue-red crystals from methanol, and 2-(3'-chloro-anilino)-3-(3''-chloro - phenylimino) - 5 - (β - diethylamino - ethyl) - 3.5 - dihydro - phenazine, M.P. 122–123°, red crystals from ethanol; 4.5-bis-(3'.4'-dichloro-anilino)-1.2-benzoquinone (or tautomer) M.P. 213–215°, small dark red prisms from ethoxyethanol, and 2-(3'.4'-dichloro-anilino) - 3 - (3''.4'' - dichloro - phenylimino)-5-(β-diethylamino - ethyl) - 3.5 - dihydro - phenazine; 4.5-bis-(3'-chloro-4'-ethoxy-anilino)-1.2-benzoquinone M.P. 177–179° red crystals from benzene, and 2-(3'-chloro-4'-ethoxy-anilino) - 3 - (3'' - chloro - 4'' - ethoxy-phenylimino)-5-(β - diethylamino - ethyl) - 3.5 - dihydro-phenazine; 4.5-bis-(m-toluidino)-1.2-benzoquinone, M.P. 121–122°, brown-red crystals from ethanol, and 2-(m-toluidino)-3-(m-tolylimino)-5-(β - diethylamino - ethyl)-3.5-dihydro-phenazine; and 4.5-bis-(3'.4'-dimethyl-anilino)-1.2-benzoquinone (or tautomer), M.P. 145°, small red crystals from ethanol, and 2-(3'.4'-dimethyl-anilino)-3-(3''.4''-dimethyl - phenylimino) - 5 - (β - diethylamino-ethyl)-3.5-dihydro-phenazine, M.P. 149–150°, brown-red prisms from ethanol.

On the other hand, if N-(β-diethylamino-ethyl)-o-phenylendiamine in the second step of the preceding examples is replaced by N-(β-dimethylamino-ethyl)-o-phenylendiamine; 2-(p-toluidino)-3-(p-tolylimino)-5-(β-dimethylamino-ethyl)-3.5-dihydro-phenazine, 2-(4'-ethoxy - anilino) - 3 - (4'' - ethoxy - phenylimino) - 5 - (β-dimethylamino-ethyl)-3.5-dihydro-phenazine and 2-(4'-chloro - anilino) - 3 - (4'' - chloro - phenylamino) - 5-(β-dimethylamino-ethyl)-3.5-dihydro-phenazine are obtained in an analogous manner.

*Example 4*

2.5 parts of 2-anilino-3-imino-5-phenyl-3.5-dihydro-phenazine hydrochloride, 5 parts by volume of β-diethylamino-ethylamine and 25 parts by volume of dioxan are boiled under reflux for 30 minutes. The solution is then cooled, diluted with water and the 2-anilino-3-(β-diethylamino-ethylimino)-5-phenyl-3.5-dihydro-phenazine is filtered off. It is recrystallised from ethanol, whereupon it is obtained as bronze plates melting at 138–140°.

If, instead of β-diethylamino-ethylamine, the same volume of β-dimethylamino-ethylamine or of γ-dimethylamino-propylamine is used, then 2-anilino-3-(β-dimethylamino - ethylimino) - 5 - phenyl - 3.5 - dihydro - phenazine or 2-anilino-3-(γ-dimethylamino-propylimino)-5-phenyl-3.5-dihydro-phenazine are obtained in the same manner.

*Example 5*

1.9 parts of 2-(p-chloro-anilino)-3-imino-5-(p-chloro-phenyl)-3.5-dihydro-phenazine hydrochloride, 5 parts by volume of β-diethylamino-ethylamine and 60 parts by volume of dioxan are boiled under reflux for 45 minutes. The solution is cooled, diluted with water and the precipitate is filtered off. The 2-(p-chloro-anilino)-3-(β-diethylamino - ethylimino) - 5 - (p - chloro - phenyl)-3.5-dihydro-phenazine melts at 158–160° when recrystallised from ethanol (red-brown needles).

2 - (p-chloro - anilino) - 3 - (β - dimethylamino - ethylimino) - 5 - (p - chloro - phenyl) - 3.5 - dihydro - phenazine and 2-(p-chloro-anilino)-3-(γ-diethylamino-propylimino)-5-(p-chloro-phenyl)-3.5-dihydro-phenazine are obtained analogously if β-diethylamino-ethylamine is replaced by the same volume of β-dimethylamino-ethylamine or γ-diethylamino-propylamine respectively.

The new phenazine derivatives according to the present invention can be used for the peroral treatment of tuberculous diseases in doses of about 1–3 mg. per kg. weight of the patient. Particularly advantageous is the combination of such phenazine derivatives with other tuberculostatics which are administered per os for the purpose of preventing or retarding the development of tubercle strains which are resistant to medicaments and the relapses caused thereby. Such combinations can contain for example 15 mg. of 2-anilino-3-(β-diethylamino-ethylimino)-5-phenyl-3.5-dihydro-phenazine and 45 mg. of isonicotinic acid hydrazide per tablet or dragée. About 6–8 of such tablets are administered to adults daily which corresponds to one tablet per 10 kg. body weight.

What we claim is:

1. Phenazine derivatives of the formula:

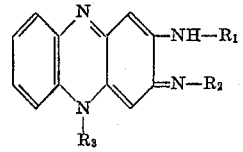

wherein two of the symbols $R_1$, $R_2$ and $R_3$ represent the same aryl radicals selected from the group consisting of phenyl, chlorophenyl, lower alkylphenyl and lower alkoxyphenyl, and the third symbol represents a lower dialkylaminoalkyl radical.

2. 2 - (p - chlor - anilino) - 3 - (β - diethylamino-ethylimino)-5-(p-chloro-phenyl)-3.5-dihydro-phenazine.

3. 2 - p - toluidino - 3 - (p - tolyl - imino) - 5 - (β - diethylamino-ethyl)-3.5-dihydro-phenazine.

4. 2 - anilino - 3 - (β - diethylamino - ethylimino) - 5-phenyl-3.5-dihydro-phenazine.

References Cited in the file of this patent

Barry et al.: Journal Chemical Society (London), 1956, pp. 893–5.
Chemical Reviews, vol. 35, p. 389 (1944).
Kehrmann: Berichte der Deutsche Chem. Gesell., vol. 56, pp. 2394–2395 (1923).